(No Model.) 2 Sheets—Sheet 1.

B. McKEEN.
MACHINE FOR PUTTING OUT OR STRETCHING SKINS.

No. 295,787. Patented Mar. 25, 1884.

Witnesses
S. N. Piper
E. B. Pratt

Inventor
Benjamin McKeen
by R. H. Eddy atty (No Model.) 2 Sheets—Sheet 2.

B. McKEEN.
MACHINE FOR PUTTING OUT OR STRETCHING SKINS.

No. 295,787. Patented Mar. 25, 1884.

Witnesses.
S. N. Piper
E. B. Pratt

Inventor.
Benjamin McKeen.
by R. H. Eddy atty.

UNITED STATES PATENT OFFICE.

BENJAMIN McKEEN, OF PEABODY, ASSIGNOR OF ONE-FOURTH TO DANIEL MURRAY, OF SALEM, MASSACHUSETTS.

MACHINE FOR PUTTING OUT OR STRETCHING SKINS.

SPECIFICATION forming part of Letters Patent No. 295,787, dated March 25, 1884.

Application filed January 31, 1884. (No model.)

*To all whom it may concern:*

Be it known that I, BENJAMIN McKEEN, of Peabody, in the county of Essex, of the Commonwealth of Massachusetts, have invented a new and useful Improvement in Machinery for Putting Out or Stretching Skins, &c.; and I do hereby declare the same to be described in the following specification, and represented in the accompanying drawings, of which—

Figure 1:
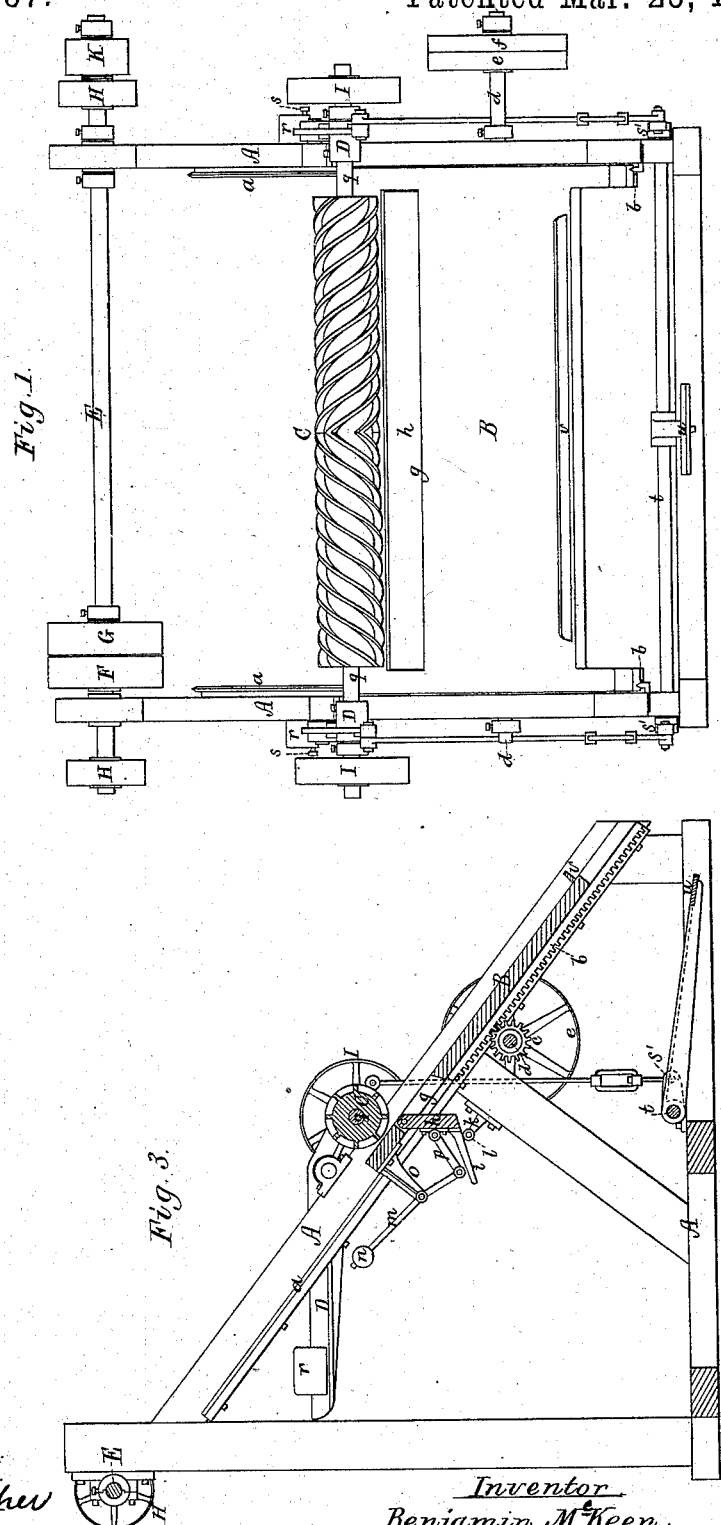
Figure 2:
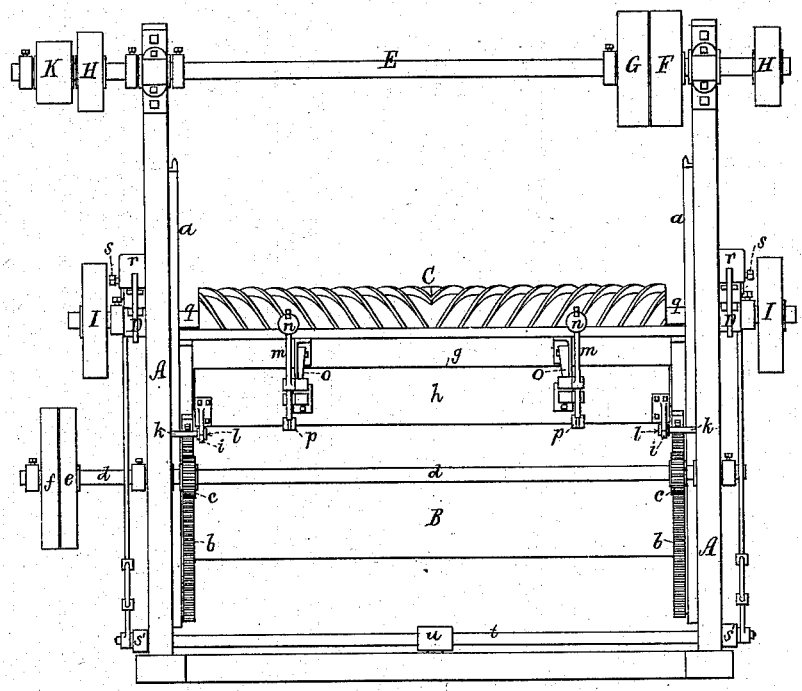
Figure 5:
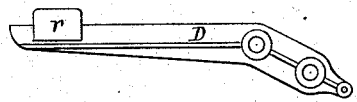
Figure 4:
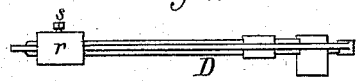

Figure 1 is a front elevation, Fig. 2 a rear view, and Fig. 3 a vertical and median section, of a machine embodying my invention, the nature of which is defined in the claims hereinafter presented. Fig. 4 is a top view, and Fig. 5 a side view, of one of the levers D, hereinafter referred to.

The machine is to stretch laterally a wet skin and remove wrinkles and water therefrom, such being termed by tanners "putting out" the skin.

In the drawings, A denotes the frame for supporting the principal operative parts. Within this frame is a table or platform, B, for sustaining a skin to be operated on. This table, with its supporting-ways $a\ a$, is inclined to the horizon. Near each of its ends the table has a rack, $b$, extending down from it, to engage with one of two pinions, $c$, fixed on a horizontal shaft, $d$, arranged as shown, and provided with a fast pulley, $e$, and a loose pulley, $f$.

Through the table or platform B, at its upper part, is a rectangular opening, $g$, provided with a closing door or clamp, $h$, duly hinged or pivoted to the table, so as to be capable of being moved down from the opening into the position as shown in Fig. 3. This door or clamp has mechanism for automatically operating it. Near each end of the said clamp is an arm, $i$, that projects from the clamp in manner as represented in Fig. 3. The table, in descending, carries the said arm against a friction-roller, $l$, supported by a stationary bracket, $k$, whereby the clamp will be moved downward relatively to the opening $g$. A lever, $m$, arranged as shown, and provided with a weight, $n$, and fulcrumed to a bracket, $o$, extended from the table, has its shorter arm joined to the clamp by a link, $p$. There are two of such weighted levers to the said clamp, they being arranged as shown in Figs. 2 and 3. On the table being moved upward the weights $n$ of the levers $m$ will be free to descend and move the levers, so as to enable the clamp to rise into the opening $g$.

Over the platform or table B is a cylinder, C, screw-threaded on its periphery, the threads on one half of the cylinder, from one end to the middle of it, running in a direction the reverse of those on the other half of it, as represented. The shaft $q$ of this cylinder has its journals supported in bearings in the shorter arms of two levers, D, such levers being fulcrumed to the frame A, and each having to its longer arm a sliding weight, $r$, provided with a screw, $s$, for clamping such weight to the said arm.

To the inner end of each lever D a connecting-rod at its upper end is jointed. This rod at its lower end is jointed to an arm, $s'$, projected from a shaft, $t$, to whose middle a pedal, $u$, is fixed. On depressing the said pedal the screw-threaded cylinder C will be moved downward toward the table or platform B, from whose lower part there is projected, as shown, a lip, $v$. This lip is not only to intercept any water that may flow down upon the table, but to turn such water laterally, so as to cause it to pass off or be deflected from the table at the ends of the lip without descending upon a workman whose feet may be on the pedal.

In the upper part of the frame A there is a driving-shaft, E, carrying a fast pulley, F, and a loose pulley, G, they being to receive a belt from a suitable motor. Besides the said fast and loose pulleys, there are secured upon the shaft E two other pulleys, H, to which and one of two pulleys, I, fixed on the shaft $q$ of the cylinder C, an endless belt is to be applied. Another such belt is to be adapted to a pulley, K, on the shaft E, and to one of the two pulleys $e$ and $f$ on the shaft $d$.

In order that the lip $v$ may not be carried into contact with the screw-threaded cylinder while the table or platform B may be in the act of being moved upward, the machine may have some suitable mechanism for automatically shifting at the proper time the endless belt from the fast to the loose pulley of the shaft $d$.

In operating with the machine, an attendant, when the table B is at its lowest position, is to lay upon it a wet skin, so as to allow the upper part of such skin to fall a short distance into the opening $g$. This having been done, he, by a proper shipper, is to ship the driving-belt from the loose pulley G to the fast pulley F, whereby the shaft E will be put in revolution. As a consequence the screw-threaded cylinder C will be revolved and the table B will be forced upward. Before the skin may reach the cylinder C the clamp will have been forced upward into the opening $g$, so as to clamp to the table the part of the skin within such opening. As the table may ascend beneath the cylinder C, the latter will be revolved on the skin and will spread or stretch it laterally in opposite ways from its middle and remove from it any wrinkles, the attendant by pressure of his foot in the meantime on the pedal causing the screw-threads of the cylinder to be borne in close contact with the skin.

By having the bed and its ways inclined to the horizon the water discharged from the skin by the screw-threaded cylinder will by gravity be caused to flow down the table and escape therefrom.

I claim, in a machine for putting out or stretching a skin in manner as described—

1. The combination of the bed or platform and its guideways inclined to the horizon and provided with mechanism for reciprocating the said bed rectilinearly on its ways, with the screw-threaded cylinder and its weighted supporting-levers for raising it, and the mechanism for depressing it, all being adapted and to operate substantially as set forth.

2. The combination of the bed B, having the opening $g$, with the door or clamp $h$ and mechanism for operating it, as and for the purpose described, during the movements of the bed, substantially as set forth, such mechanism consisting of the weighted lever $m$, link $p$, arm $i$, and bracket $k$, provided with the roller $l$, all being adapted to operate essentially as represented.

3. The combination of the inclined bed, movable, and provided with a water intercepting and deflecting lip arranged with it, as described, with the screw-threaded cylinder arranged and provided with mechanism for operating it relatively to such bed, substantially as represented.

BENJAMIN McKEEN.

Witnesses:
   GEO. HOLMAN,
   J. ARTHUR McKEEN.